UNITED STATES PATENT OFFICE.

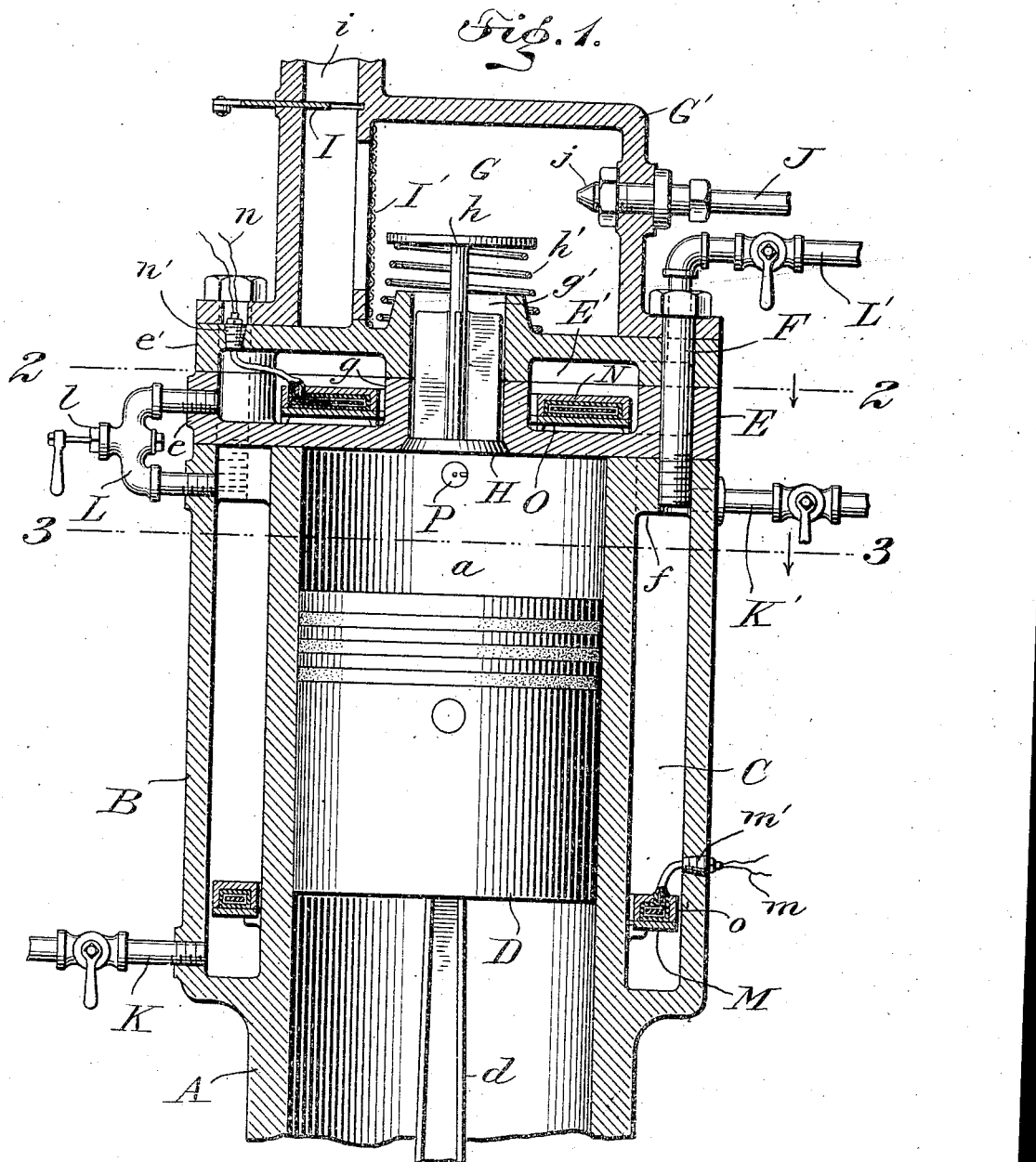

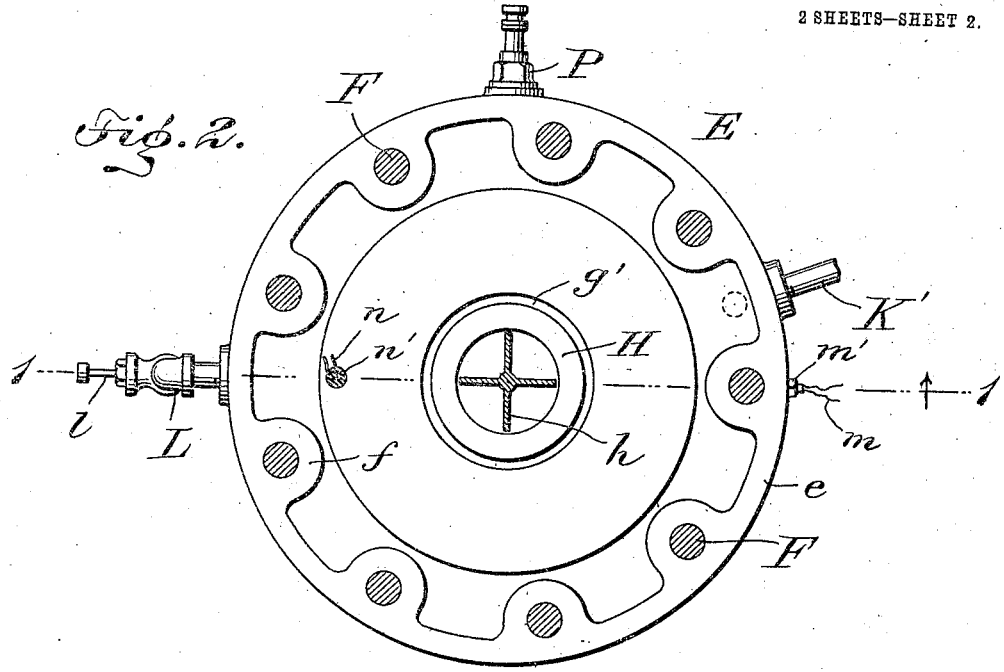
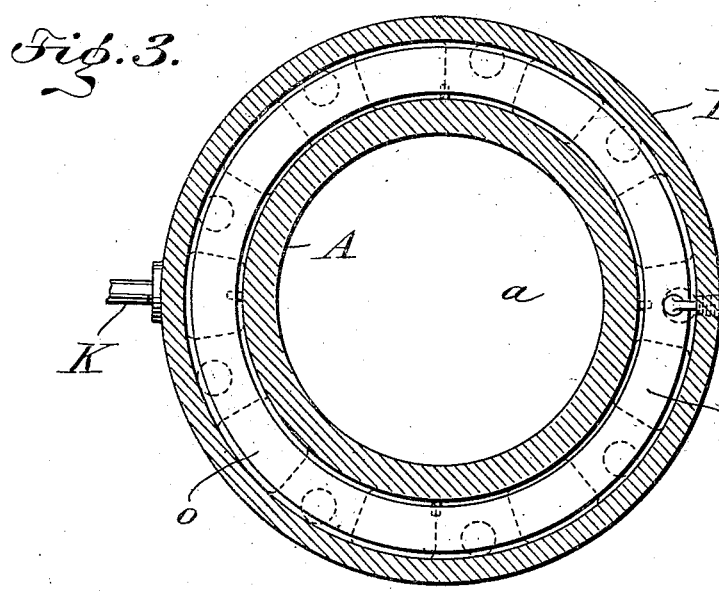

ABBOT AUGUSTUS LOW, OF HORSESHOE, AND AUGUST WASSMANN, OF ASTORIA, NEW YORK; SAID WASSMANN ASSIGNOR TO SAID LOW.

MEANS FOR ELECTRICALLY HEATING WATER-COOLED COMBUSTION-ENGINES.

968,780.  Specification of Letters Patent. Patented Aug. 30, 1910.

Application filed March 6, 1907. Serial No. 360,977.

*To all whom it may concern:*

Be it known that we, ABBOT AUGUSTUS LOW and AUGUST WASSMANN, citizens of the United States, residing at Horseshoe and Astoria, Long Island, respectively, State of New York, have invented certain new and useful Means for Electrically Heating Water-Cooled Combustion-Engines, of which the following is a specification.

This invention appertains to an internal combustion engine of that type wherein the cylinder is cooled by the circulation of a fluid, usually water, around the cylinder and through the head thereof.

More particularly, the type of engine to which the invention relates is operated by the combustion of kerosene which is first mixed with air to produce an explosive vapor, the resulting gaseous mixture being drawn into the cylinder by the suction of the piston. In starting an engine of this class, the oil contained in the explosive mixture, when admitted to the cylinder, has a tendency to condense or liquefy owing to its contact with the cold surface of the cylinder and its head, and thereby interfere with the rapid starting of the engine as well as to result in a loss of fuel, and produce disagreeable odors. Various expedients have been resorted to for overcoming such objections, among which are the heating of the cylinder by the flame from a torch, or by the direct burning of a quantity of free oil, or by introducing into the cylinder, as the initial or starting charge, a mixture containing a highly inflammable and volatile fluid, such as naphtha, differing from the heavier oil (kerosene) normally used to furnish the motive power for the engine. Our invention overcomes the said objections, and others, in a simple, efficient, expeditious and economical manner, and consists in combining with the engine, particularly with the cylinder thereof, means for electrically heating said cylinder, or its head, or both, by raising the temperature of the medium employed during the normal operation of the engine for cooling the same. The cylinder and its head are thus sufficiently heated to overcome condensation of the fuel in starting the engine, and to permit the engine to be started and operated without necessitating the employment of any combustible except kerosene.

In the accompanying drawings, we have illustrated one embodiment of the invention, but the construction shown therein is to be understood as illustrative only, and not as defining the limits of the invention.

Figure 1 is a vertical section through a portion of an internal combustion engine equipped with our means for electrically heating the same. Figs. 2 and 3 are cross sectional views on the lines 2—2 and 3—3, respectively, of Fig. 1.

A, designates a portion of a cylinder forming a part of an internal combustion engine, and B is a jacket which incases a part of said cylinder and forms therewith a space or chamber, C, in which is adapted to circulate a cooling medium, such as water. In the cylinder, A, operates a piston, D, having a piston rod, $d$. These parts are of the usual, or preferred, construction.

At its upper end the cylinder, A, is provided with a head, E, which may be secured in position on the cylinder by suitable means, as for example, by providing the cylinder and the head with matching lugs adapted to receive suitable bolts, but in the drawings we have shown the head, E, as being secured detachably to said cylinder by bolts, F, the lower ends of which are screwed into lugs, $f$, which are provided in the upper part of the cylinder, preferably in the cooling chamber, C, thereof. The cylinder head, E, is provided with a chamber, E′, for the circulation of a cooling medium, the said chamber, E′, of the head being independent of the chamber, C, of the cylinder. It is preferred to construct the cylinder head, E, in sections, indicated at $e$, $e'$, the meeting faces of said sections being recessed to produce the circulating chamber, E′, see Fig. 1. The two members or sections of the cylinder head are clamped or secured together by the same bolts, F, which fasten the head to the cylinder, but this detail of construction may be modified or varied as desired. As shown, the cylinder head is provided with a central tube, $g$, which forms an inlet passage, $g'$, from a mixing chamber, G, to the piston chamber, $a$, of the cylinder A. Said inlet passage is closed normally by a valve, H, herein shown as having a stem, $h$, on which acts a spring, $h'$, for the purpose of keeping the valve, H, seated against the cylinder head.

Any suitable means may be employed for supplying a combustible mixture or vapor to the engine cylinder. In Fig. 1 we have shown a casing, G', mounted on a cylinder head, E, said casing providing the mixing chamber, G. The casing, G', is provided with an air inlet, i, across which operates a regulating valve, I, and between the inlet, i, and the chamber, G, is a diaphragm, I', composed of any suitable foraminous material, such as metallic gauze. The feed pipe, J, for supplying a combustible liquid, such as kerosene, is coupled to the casing, G', said pipe being in communication with a jet nozzle, j, adapted to inject the stream of combustible liquid across the chamber, G, and against the diaphragm, I', whereby the jet of liquid is broken up by the diaphragm and is mixed or combined mechanically with air entering the opening, i. In the operation of the engine, the cylinder, its head and the casing, G', are heated by the explosion of the combustible vapor, but when the engine is started, any suitable means may be employed for converting the mixture of air and liquid into the combustible vapor prior to the admission of such vapor into the engine cylinder.

A cooling medium (water) is supplied to the circulating chamber, C, of the cylinder by a feed pipe, K, and the water is conducted through said chamber by an outlet pipe, K', whereby the water is caused to circulate around and in contact with the walls of the cylinder for the purpose of keeping the same at the required temperature. The cooling medium may be supplied to the chamber, E', of the cylinder head independently of the source of supply to the jacketed cylinder, A, but under ordinary conditions we prefer to conduct the cooling medium from the cylinder to the chamber of the head by a by-pass, L. The by-pass is shown in Fig. 1 as a substantially U-shaped pipe having one leg connected to the jacket, B, and the other to a member of the head, E, and for the purpose of controlling the supply of water to the chambered cylinder head, said by-pass, L, is provided with a suitable cock or valve, l, the latter being opened and closed at will. The water is conducted from the chamber of the cylinder head by a pipe, L', and the eduction pipes, K', L', are, or may be, provided with suitable controlling valves.

We prefer to employ electric heating devices, M, N, in the chambers, C, E', respectively, of the cylinder and the head. The heater, M, for the jacketed cylinder is located at any suitable point in the chamber, C, preferably at the lower part thereof, although the particular location is immaterial. Said heater is of annular shape, in order that it may fit around the cylinder, A, and take up a very small space in the chamber, C, and this heater is adapted to be supplied with an electrical current from any suitable source of supply by means of the conductors, m, which are carried through an insulating and water tight bushing, m', attached to the jacket, B. The other heater, N, is, also, of annular form in order that it may be placed within the chamber, E', of the cylinder head, around the tube, g, forming the inlet for the combustible vapor. Said heater, N, is arranged compactly within the chambered head, E, and it is supplied with an electrical current by the conductors, n, which extend through a water tight and insulating bushing, n', the latter being fastened to one section, e', of said cylinder head. If desired the electrical current may be supplied to the heaters, M, N, by conductors forming independent electric circuits, or the two heaters may be supplied with current by a common circuit from any suitable source. Each electric heater may be constructed in any preferred way known to those skilled in the art, but we prefer to employ an electric heater of the type disclosed in an application filed by Harry Hertzberg and A. A. Low, Serial No. 356,792, Feb. 11, 1907, wherein there is disclosed an electrical resistance, preferably a metallic coil, which is wrapped on a core of insulating material, said core being inclosed between thin layers of insulating material which are in direct contact with a mass or masses of metal, the latter being adapted to absorb the heat developed by said resistance or coil practically as fast as the heat is generated. Said resistance and its insulations are inclosed or contained within a water tight metallic casing, O, the latter constituting the metallic mass which is adapted to be heated by the current supplied to the electrical resistance. The casing of the electric heater is situated within the circulating chamber so as to be immersed in the fluid circulating therein, said fluid having direct contact with the aforesaid casing, O, of said heaters.

It is preferred to employ the heaters, M, N, independently, and to manipulate the engine in a way for the heater, N, to heat up the cylinder head, E. By closing the cocks in the pipes, K', L', and opening the cock in the by-pass, L, water is supplied to the chambers, C, E'. The current is admitted to the heater, N, and the water in the head, E, is heated by the action of said heater, whereby the temperature of the head itself is raised to the desired point. Should it be found necessary to heat the cylinder, A, the current is admitted to the heater, M, and thus the water contained in the chambers, C, E', is heated for the purpose of heating the cylinder and its head. Should it be found desirable the heater, M, may be used to the exclusion of the heater, N, thus making provision for heating the cylinder independently of the head thereof.

As is usual in engines of this class the cylinder, A, is provided with an igniter or spark plug, P, the latter being of any suitable construction and placed at any suitable point in the combustion chamber, a, of the engine.

From the foregoing description taken in connection with the drawings, the operation of our invention will be readily understood by those skilled in the art. The electric heaters (one or both) are employed for heating the water, in order to bring the cylinder and the head to the desired temperature before starting the engine, thus overcoming any tendency of the combustible vapor to condense by contact with the cold walls of the engine cylinder or the head. When the engine is in operation, the cylinder and the head are heated by the combustion of the explosive vapor, and it is not necessary, therefore, to employ the electric heaters. Under these conditions the current is cut off from both heaters, and the proper cocks in the circulating pipes are opened for the purpose of permitting the cooling medium to circulate around the cylinder and through the head thereof.

Having thus fully described the invention, what we claim as new and desire to secure by Letters Patent is:—

1. In an internal combustion engine, a jacketed cylinder, and an annular electrically operated heater located in the jacket of said cylinder for heating a fluid therein, said annular heater partially inclosing said cylinder.

2. In an internal combustion engine, a chambered cylinder head adapted to contain a fluid, a valve box extending through the chamber of said cylinder head, and an annular electrically operated heater in the chamber of said head for heating a fluid therein, said annular heater partially inclosing said valve box.

3. In an internal combustion engine, a jacketed piston cylinder, a chambered cylinder head, means whereby liquid may flow from the chamber of the cylinder head to a chamber of said jacketed cylinder, and vice versa, and electrically operated heaters positioned within said chamber of the cylinder head and the chamber of the jacketed cylinder, respectively.

4. In an internal combustion engine, a cylinder having a circulating chamber, a head provided with a circulating chamber, means for shutting off the circulation of a fluid through said chambers, and electrically-operated heaters in the respective chambers of the cylinder and the head.

5. In an internal combustion engine, a water-containing chamber for a cylinder or the head thereof, and an annular watertight electrically-operated heater in said chamber, said heater surrounding the cylinder of said engine.

6. In an internal combustion engine, a chambered cylinder-head having a passage for the inlet of an explosive vapor to a cylinder, means for admitting a fluid to the chamber of said head, and an annular water-tight electrically-operated heater in the chamber of said head.

7. In an internal combustion engine, a cylinder having a fluid-chamber, a head also provided with a fluid-chamber, means connecting said chambers for fluid to pass from one to the other, and a water-tight electrically-operated heater in each chamber.

8. In an internal combustion engine, a jacketed cylinder, a chambered head, means for supplying a liquid to said jacket of the cylinder and the chamber of the head, a valved by-pass connecting the chambers of said cylinder and said head, and electrically-operated heaters in the respective chambers for heating the liquid therein.

9. In an internal combustion engine, a jacketed cylinder, a chambered head, a valved by-pass connecting the chambers of said cylinder and said head, and annular water tight heaters within said chambers.

10. In an internal combustion engine, a fluid chamber in a cylinder and the head thereof, and an annular water tight heater in said chamber, said heater surrounding said cylinder.

In testimony whereof we have signed our names to this specification in the presence of two subscribing witnesses.

ABBOT AUGUSTUS LOW.
AUGUST WASSMANN.

Witnesses:
M. A. WARREN,
GEO. WELLING GIDDINGS.